United States Patent [19]

Clark

[11] 4,402,041
[45] Aug. 30, 1983

[54] PLURAL STORAGE AREAS WITH DIFFERENT PRIORITIES IN A PROCESSOR SYSTEM SEPARATED BY PROCESSOR CONTROLLED LOGIC

[75] Inventor: James M. Clark, Cedar Grove, N.J.

[73] Assignee: International Telephone and Telegraph Corporation, New York, N.Y.

[21] Appl. No.: 202,523

[22] Filed: Oct. 31, 1980

[51] Int. Cl.³ .......................................... G06F 13/00
[52] U.S. Cl. ................................................ 364/200
[58] Field of Search ... 364/200 MS File, 900 MS File

[56] References Cited

U.S. PATENT DOCUMENTS 4,181,940  1/1980  Underwood et al. ............... 364/200

*Primary Examiner*—Raulfe B. Zache
*Attorney, Agent, or Firm*—John T. O'Halloran; Robert E. Lee, Jr.

[57] ABSTRACT

There is disclosed apparatus for keeping two or more distinct groups of data separate from each other within a processor based system. The system employs at least two system areas, where one system area is assigned to have higher priority data than the other. By detecting the priority of a data operation, the lower priority system area is prevented by means of gates from having high priority data written into the lower priority system area. The higher priority system area can read data from the lower priority system area at all times and the lower priority system area can write data into the higher priority system area at all times.

16 Claims, 5 Drawing Figures

Fig. 2

|  | HIGH PRIORITY MODE | MEDIUM PRIORITY MODE | LOW PRIORITY MODE |
|---|---|---|---|
| READ | ALL SYSTEM AREA (11,12,13) | MEDIUM AND LOW SYSTEM AREA (11 AND 12) | LOW SYSTEM AREA (11) |
| WRITE | HIGH SYSTEM AREA (13) | MEDIUM AND HIGH SYSTEM AREA (12 AND 13) | ALL SYSTEM AREA (11,12,13) |

PLURAL STORAGE AREAS WITH DIFFERENT PRIORITIES IN A PROCESSOR SYSTEM SEPARATED BY PROCESSOR CONTROLLED LOGIC

BACKGROUND OF THE INVENTION

This invention relates to apparatus for separating two or more distinct groups of data within a processor based system and more particularly relates to a processor based system possessing a plurality of system areas, each system area includes conventional memory and/or input/output (I/O) device(s) or any combination thereof. Each of these system areas has access rights and restrictions relating to the flow of data among the system areas. Each system area may have a given priority and means for preventing data from being transferred from a higher priority to a lower priority system area.

It is completely clear that the use of processor based systems in present society is extremely wide-spread. The processor or computer is used as an everyday business tool in a wide variety of applications. In fact, as is well known, complete textbooks as well as many U.S. patents describe computer systems which are employed in business, banks, medicine and other industries for a host of different applications and to enable a wide dissemination of data necessary to implement and assist such operations. The widespread use of computers or processors in regard to various applications has developed a need to assure that certain types of data in general be secured and hence, certain types of business data, as will be explained, should not be made available to users of the processing system who do not have the authority to gain access to such data.

In order to fully comprehend the ramifications of selective data access, a typical example will be given in order to fully explain the nature of the problem. A typical business enterprise may include salesmen who are conventionally responsible for the sale of products, an engineering staff which is responsible for the design and development of future products and a higher management level staff which is responsible for the entire operations of a corporation in regard to future product development as well as the financial data. The business organizations typically employ a processing system which stores data concerning all levels of activities. Hence, the salesmen, engineers as well as high level management all have access to the processor in order to enable them to perform their everyday work tasks.

In any event, it is apparent that salesmen, for example, should not have access to certain data which is only available to the top executives. In a similar manner, the salesman should not have access to a middle class of data which is only available, for example, to the engineering staff. Alternatively, the top management should have access to all data, whether it be engineering or sales data. The engineers could have access to their own level of data as well as to the lower priority data available to the salesman. In this manner, the salesman should only have access to data which is of low priority.

The above concept appears completely reasonable but in order to implement such a system, one must be able to control the storage of data in proper memories and to prevent higher priority data from being inadvertently directed into lower priority memory or I/O locations. The solution of the problem will thereby enable one to maintain two or more distinct groups of data separate from each other within a processor based system.

It is therefore an object of the present invention to provide apparatus for maintaining data integrity according to priority or other appropriate access rights and restrictions in a processor based computer system.

BRIEF DESCRIPTION OF THE PREFERRED EMBODIMENT

Apparatus for the separation of stored data in a processor based system comprising a central processor capable of processing data as retrieved from memory, comprising two or more system areas, for example, first system area means capable of having stored therein or inputting or outputting first data of a first given priority, said first system area having a read output coupled to said processor and a write input, second system areas means capable of having stored therein or inputting or outputting second data of a second given higher priority, said second system area having a write input coupled to said processor and a read output, first logic means operative to couple said write input of said first system area means to said processor, second logic means operative to couple said read output of said second system area means to said processor, and control means responsive to an access request from said processor and operative to inhibit said first logic means and enable said second logic means when said second system area is accessed to thereby enable said second data to be exclusively read and written into said second system area means while always enabling first data to be read into said processor, and control means is also responsive to an access request from said processor and operative to inhibit said second logic means and enable said first logic means when said first system area is accessed to thereby enable said first data to be exclusively read and written into said first system area means while always enabling said first data to be written into said second system area.

BRIEF DESCRIPTION OF THE DRAWINGS

Above-mentioned and other features and objects of this invention will become more apparent by reference to the following description taken in conjunction with the accompanying drawings, in which:

FIG. 2 is a table depicting logic operation according to this invention;

DETAILED DESCRIPTION OF THE INVENTION

Figure 1:
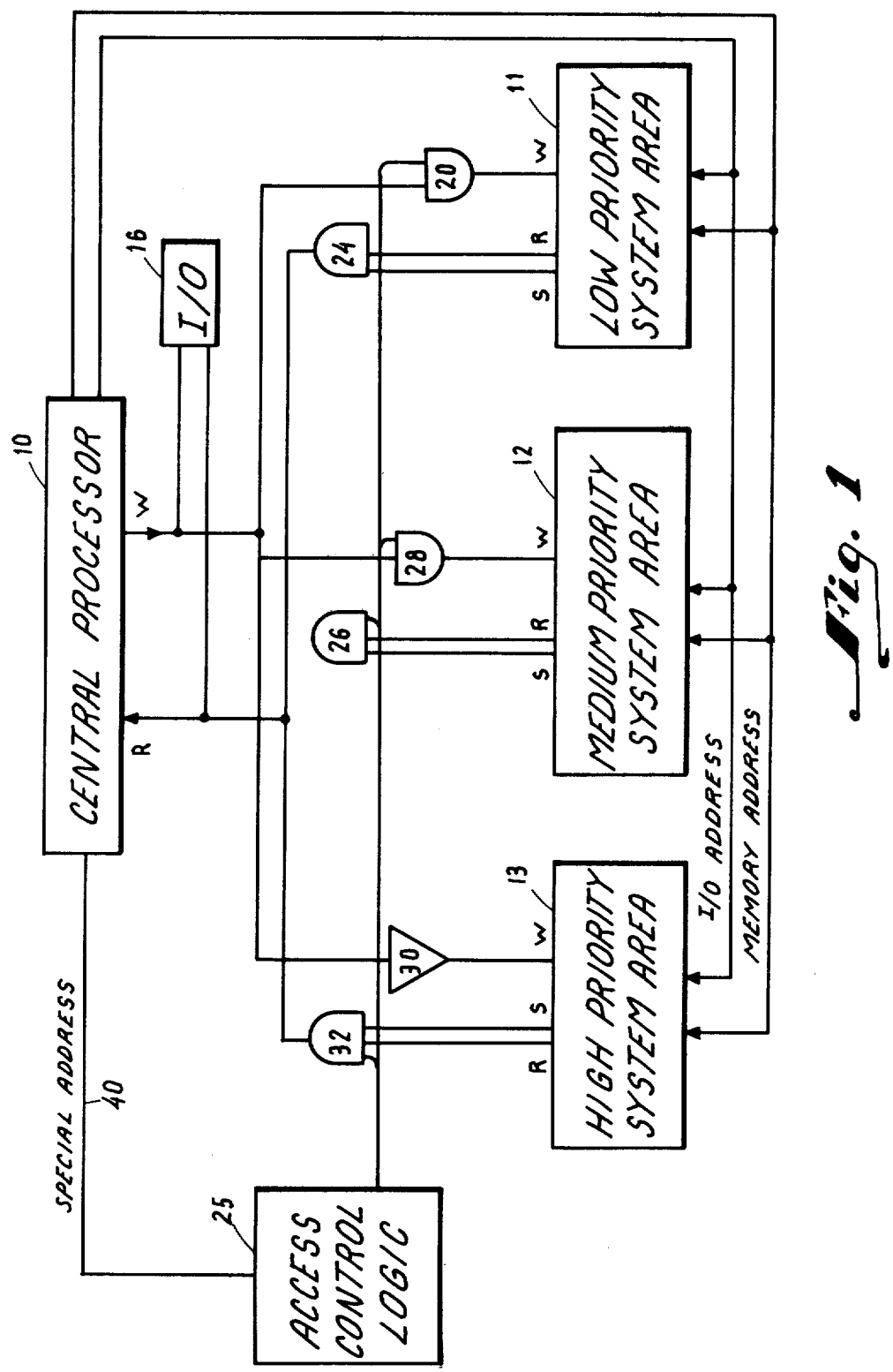
FIG. 1 is a block diagram of a data separation system according to this invention.

Referring to FIG. 1, there is shown a central processor 10. The processor 10 may be of a well known format and many examples of suitable processors exist. For purposes of illustration, separate lines are used to show read and write data as well as special, memory, and I/O addresses. It is understood that these data and address paths may be combined depending on the processor used. The processor 10, as indicated, may be of conventional architecture and techniques for constructing such processors are well known in the art. See for example a text entitled "Computer Architecture" by C. C. Foster, second edition (1976), Van Nostrand Reinhold Co.

Essentially, the processor 10 is a single processor which is employed in the system and the processor 10 cannot be used to totally govern itself with respect to data access. This is so in view of the above noted rights and restrictions.

The processor 10 is shown coupled to three system areas designated as 11, 12 and 13. Essentially, the system area 11 is classified as a low priority system area, system area 12 is a medium priority system area, while system area 13 is a high priority system area. All memory and I/O devices in the total system are permanently divided by design among the system areas and the processor according to the need to apply appropriate rights and restrictions. Each system area includes a fixed subset of the total system input/output (I/O) devices, and a fixed subset of the total system memory but each system area shares the same central processor 10. The processor 10 typically includes memory in the form of registers and may include other memory and I/O devices.

In accordance with the above noted description, the low priority system area 11 may contain only data pertinent to sales activity (low priority data). Medium priority system area 12 may contain data pertinent to product design (medium priority data) or sales activity (low priority), while high priority system area 13 may contain any priority of data, such as high priority data which is pertinent to all business operations, including highly secure financial data. The central processor 10 may be associated with only one system area at a time during which time the processor must have the rights and restrictions (level of priority) as the system area to which it is associated. Each state of association may hereinafter be referred to as a mode of the processor.

The processor system may be coupled to I/O device(s) 16 typically used for data display for maintenance purposes. These may be, for example, a video display, a printer and so on.

According to the above noted description, the system operates according to the general rule that the given priority of data may reside in a higher or equal priority system area but not in a lower priority system area, and the system also operates according to the general rule that a given priority of data may flow into an equal or higher priority system area, but higher priority data may never flow into a lower priority system area. The system operation does not assume or require means to distinguish the different priorities of data permitted in a given system area.

Referring to FIG. 2, there is shown a table indicative of operation. The processor 10, when associating with the high priority system area 13 (high priority mode) may read data from all system areas 11, 12 and 13, but may only write data in system area 13. When the processor associates itself with the medium priority system area 12 (medium priority mode), the processor may only read data from system areas 11 and 12 and may only write data into system area 12 and system area 13. When the processor 10 associates itself with low priority system area 11 (low priority mode), it may only read from system area 11 but may write to all system areas 11, 12 and 13. Hence, during high priority mode, the processor can never write data into the medium or low priority system areas. Also, during a medium priority mode, the processor cannot read data from the high priority system area 13 and cannot write into the low priority system area 11. In the low priority mode, the processor cannot read data from system areas 12 and 13. Read and write operations mentioned herein are used to refer to data transfers to or from either memory or I/O devices within the system areas.

In order to accomplish the above-noted operation, gates are positioned in series with the read and write inputs of each system area. Where data flow is sometimes restricted, a gate controlled by access control logic 25 is provided. The access control logic 25 will determine the mode of the processor by detecting a special address from the processor 10. This special address could be a program memory address, a data memory address or an I/O address. For each processor mode, the access control 25 enables and disables appropriate data paths according to the access rules of FIG. 2. In the read paths, the gates are also controlled by area select controls S responding to memory or I/O addresses. The gates with controls are shown as AND gates, but any form of gate capable of preventing data flow would suffice, such as AND, NAND, OR, NOR, multiplexer or three state device. All of these gates including gate 30 also assure that data can only flow in the allowed direction.

As seen in FIG. 1, the write input W of the low priority system area 11 receives data via gate 20, as controlled by access control logic 25. The read output of system area 11 is coupled by gate 24 to the processor 10. This gate is not coupled to the access control logic 25 and hence, the read output of system area 11 is always available to the processor 10 whenever the system area 11 is selected.

Accordingly, the medium priority system area 12 has the gates 26 and 28 on both the read R and write W paths, respectively. Control inputs for these gates are coupled to the access control logic 25. In a similar manner, the high priority system area 13 has an unobstructed input from the processor 10 to the write input via gate 30 and hence, the high priority memory can be written into at all times. The read input of the high priority system area 13 also has a gate 32 in series with its read output and controlled by the access control logic 25.

As will be explained, the placement of the gates as shown in FIG. 1 in the data paths for each system area enables the access control logic 25 to inhibit data flow when the processor 10 is restricted according to FIG. 2. As seen from FIG. 1, since data may always flow upward in priority, the processor 10 may at any time read from the low priority system area 11 and write to the high priority system area 13.

Essentially, as one can view from FIG. 2, the implementation of the access control logic 25 in regard to enabling and inhibiting of the gates is extremely simple and well within the ken of those skilled in the art.

The operation of the system will now be briefly explained in connection with FIG. 1 and FIG. 2. When a mode change to the high priority mode is necessary, the central processor 10 may indicate this to the access control logic 25 by a special address value via address line 40. This address value is detected by access control logic 25 causing it to switch to a state corresponding to the processor mode.

In this high priority state, the access control logic will operate to inhibit the write gate 28 of the medium priority system area 12 and the write gate 20 of the low priority system area 11. In this manner, when in a high priority mode, the processor can only write into the high priority system area. The access control logic 25, in this mode, also will enable read gate 32 of the high priority system area and read gate 26 from the medium priority system area 12. The processor 10 can now read any system area selected by a memory address or I/O address. Depending on the address, one of the select lines S will enable one of the gates 24, 26 or 32.

Assume next that the processor require write access to the medium priority system area 12. When a change to the medium priority mode is necessary, the central processor 10 may indicate this with another special address value via address line 40. Detection of this value causes the access control logic 25 to switch a medium priority state which then inhibits gate 32 preventing any readout from the high priority system area and enables the read and write gates 26 and 28 of system area 12, while inhibiting gate 20 to prevent any writing of medium priority data into the lower priority system area 11.

When a change to the low priority mode is necessary, central processor 10 may indicate this with a special address which switches the access control logic to a low priority state. In this state, read gates 32 and 26 from the high priority system area 13 and medium priority system area 12, respectively, are inhibited. In addition, write gates 28 and 20 to medium priority system area 12 and low priority system area 11, respectively, are enabled. In this state, gate 24 is the only read path that the processor may successfully select.

When the processor switches from a higher priority mode to a lower priority mode, any data left in the processor 10 is potentially carried from the higher priority system area to the lower priority system area since the access rights of the processor are always the same as those of the system area to which it is associated.

In order to fully safeguard system operation, one must be further assured that when the processor mode changes from higher to lower priority, that all data stored in the central processor 10 is destroyed or purged. The data may be destroyed or purged by replacing it with any fixed or preselected pattern, such as all zeroes. This purge function is to be initiated whenever a change to a lower priority mode is initiated and can be done conventionally by any processor program by one skilled in the art.

When the purge function is initiated, the processor 10 will send a special address via line 40 to the access control logic 25 to indicate the start of purge. On conclusion of purge or possibly verification, another special address via line 40 is sent to the access control logic 25 to indicate this event. Between the start and completion of purge, the access control logic 25 will disable all gates 32, 26, 28, and 20 under its control. This disablement will prevent any data flow to or from the processor 10 during a time when the processor is not fully associated with either the higher or lower priority system areas.

Figure 3:
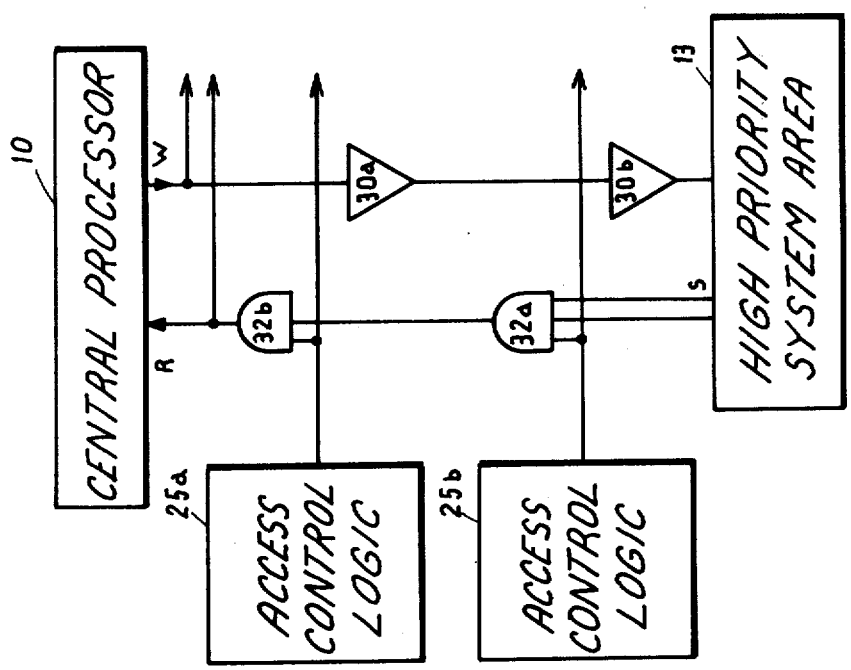
FIG. 3 is a simplified block diagram of an additional feature of this invention.

In case it is desired to retain separation of data regardless of failure of any one component of the system, this can be achieved by providing a double set of each of the gates 20, 24, 26, 28, 30, and 32 as well as access control logic 25. This double set must be connected such that if part of one set fails, the other set alone is fully capable of providing the required data separation. It is envisioned that the purge function described above may also be made redundant for similar reasons, in which case an extra address code can be provided to indicate completion of a second verification of the purge and each access control logic can verify that both purge completion special addresses are received from the processor. An example of such a redundant gate is shown in FIG. 3 for the high priority system area read gate portion of FIG. 1. It is understood that similar redundancies may be provided for the other control gates and that the gates and access control logic are identical to those previously described in connection with FIG. 1.

Referring to FIG. 3, gate 32a is controlled by one of the access control logic 25a as well as by the system area select signal S and gate 32b is independently controlled by access control logic 25b. Gate 32a is coupled in series with gate 32b. This series connection has the property that both gates 32a and 32b must be enabled in order to enable data flow from high priority system area 13 to processor 10 and that disabling either gate is sufficient to disable the same data path. Now if one gate should fail or one access control logic should fail when the data path must be inhibited, the data path will be inhibited by the remaining operative gate and control logic.

The total system may have a variety of states of the access control logic, namely, high, medium, and low priority operating modes and purge states, such as intermediate states for transitions from high to medium, medium to low or high to low priority modes. Furthermore, if redundant purge verification is provided as described hereinbefore, each purge state may be replaced by two purge states in sequence. As a result, the system may have certain sequences of states and corresponding sequences of special addresses from the processor which are expected and indicative of normal processor operation and all other sequences are unexpected, abnormal and indicative of faulty processor operation. Accordingly, the access control logic can detect a faulty processor if an additional state of the access control logic is provided called an alarm state. The access control logic can enter the alarm state when an unexpected special address is received from processor 10 via line 40. The alarm state may also activate certain indicators or shut down mechanisms.

Figure 4:
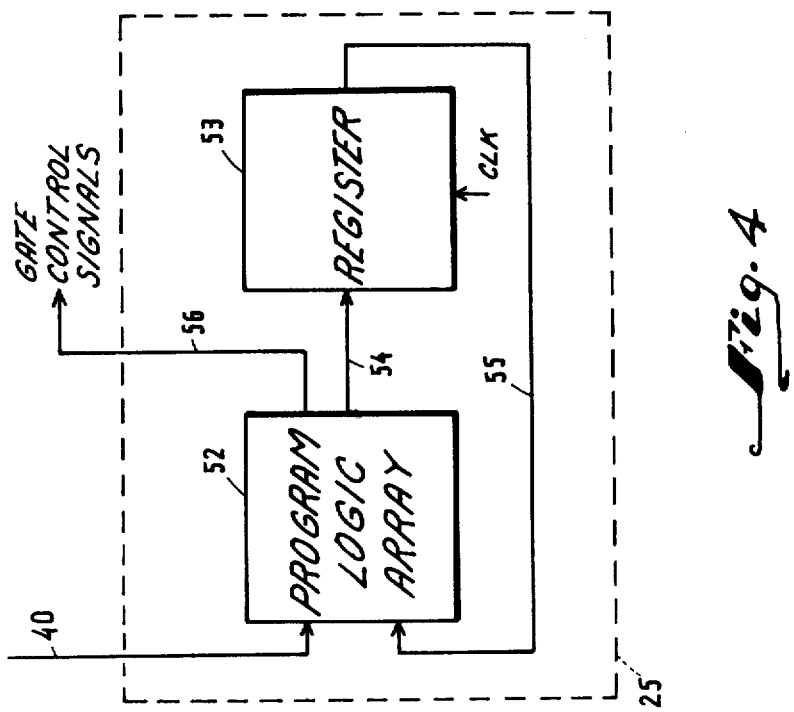
FIG. 4 is a simplified block diagram of an access control logic circuit.

All of the functions attributed to the access control logic 25 may be readily implemented by one skilled in the art as a sequential logic device, that is, a device that makes predefined transitions among predefined states in response to predefined inputs. For example, the access control logic may be a circuit shown in FIG. 4 comprised of a program logic array (PLA) 52 and register 53. The PLA is a device that can produce outputs which are AND-OR functions of its inputs, that is, a given PLA output may be an OR function of a selected number of AND functions, each of which is an AND function of selected inputs to the PLA. In FIG. 4, PLA 52 provides a next state code 54 input to register 53 in response to selected combinations of a previous state code 55 from the register 53 and special address 40 from the processor. The register 53 is coupled to a clock signal from the processor. Each time the register 53 receives a clock pulse, the state code 55 is made equal to state code 54, thus producing a state transition, as required. The PLA 52 provides gate control outputs 56 in response to the state code 55 such that appropriate gates are enabled or disabled for each state.

In the description of the system thus far, reference has been mainly to data flow to and from the respective system areas (write and read, respectively). However, since each system area may contain both memory and I/O devices, there exists a possibility of data flow between memory and I/O device within each system area are under control of the processor. To control these transfers the processor needs to supply addresses to define the source and destinations of the data transfers. The processor's registers may be purged from time to time thereby causing a loss of addresses in the processor. Thus, the address data used to control such addresses must be maintained (stored and updated) in at least one of the system areas. In some system applications, the occurrence of processor-controlled data transfers within at least two system areas may be very frequent. However, it may be desirable to purge infrequently, especially if the processor has a large number of registers, as this would use the computing power of the processor more efficiently. This difference of frequency causes a conflict, since the processor needs both read and write access to update the addresses used to control such data transfers; since both read and write access can be only obtained by switching to the associated mode; and since this requires frequent switching of modes, which requires frequent purging, which is inefficient. What is needed is a means to update these addresses independent of the access mode of the processor thereby precluding the need for frequent purging.

Figure 5:
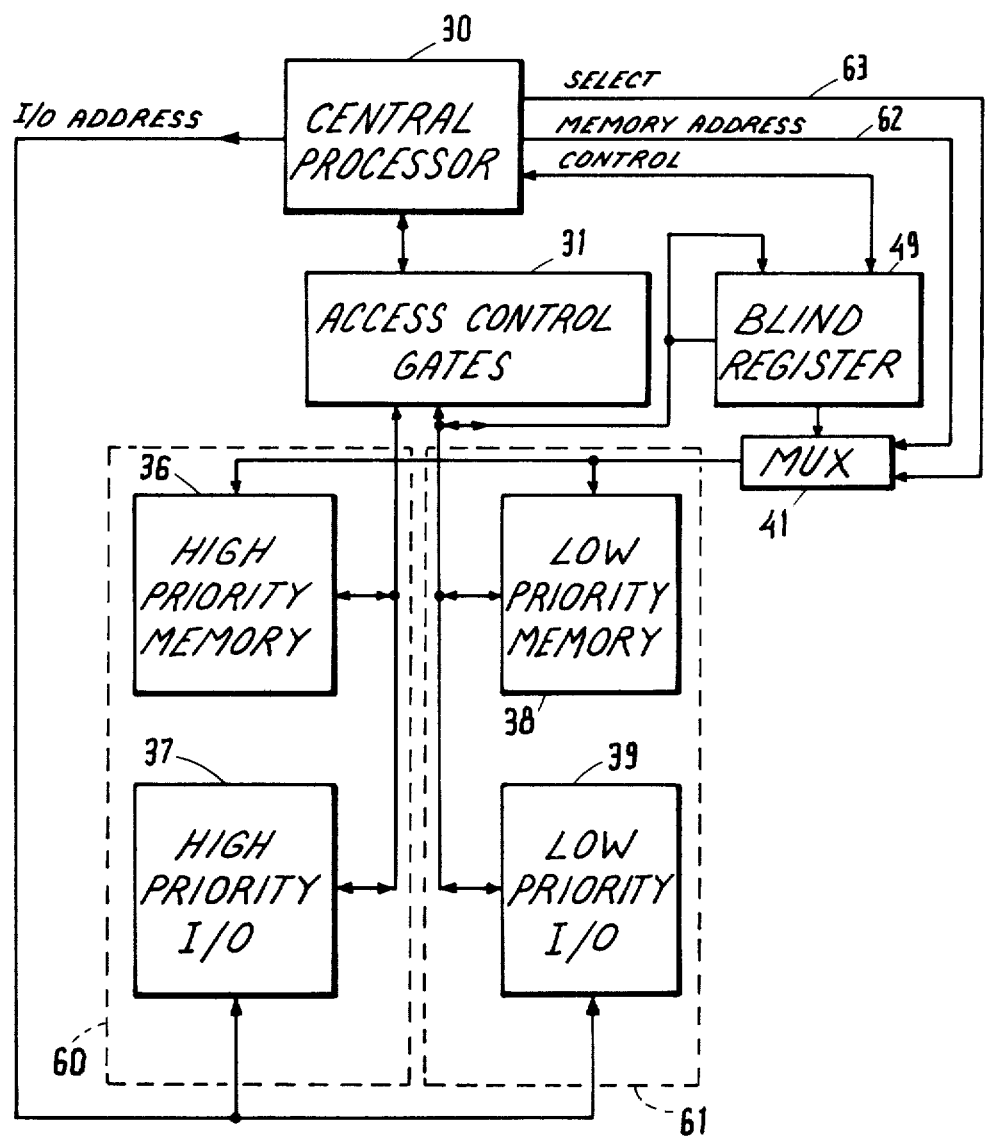
FIG. 5 is a block diagram of a further feature.

Referring to FIG. 5, there is shown an additional feature which will enable controlled data transfer within a system area, independently of the access mode of the processor as above described. In FIG. 5, a single central processor 30 is depicted which interfaces via access control gate 31 with a high priority memory 36 having a separate input/output register 37 within a high priority system area 60 and with a low priority memory 38 having a low priority input/output register 39 within a low priority system area 61.

In the system shown in FIG. 5, the processor 30 sends the address of a desired memory via cable 62. The address is coupled to a multiplexer 41 and an address from blind register 49 is also coupled to multiplexer 41. The term blind register herein refers to the situation wherein the processor controls data transfer within a given system area without necessarily having access to that data. The multiplexer 41 is controlled by a select signal 63 from the processor which selects which of the address inputs to the MUX 41 will go to the high and low priority memories 36 and 38, respectively. The blind register 49 is coupled to controls from the processor 30 which enables the blind register to be loaded with a data word from the low priority memory 38 or to increment this word or to write the word back to low priority memory 38. The blind register 49 may also detect addresses designated as end of data area, thereby detecting an end of a data transfer. The register 49 allows data transfer within a given system area to occur when the processor is not associated with that system area. Therefore, the processor can make rapid transfers of this sort in response to frequent interrupt requests withoug requiring frequent changes of mode and time-consuming purges.

Essentially, the operation of the above described system should be extemely beneficial in the environment described as well as having a multitude of other uses where the separation of data in a processing system is required. In present systems, it is known that certain users with lower priority may have separate access numbers which are entered into a keyboard and received by the processor in order to indicate the processor the user's priority level. Hence, such data tags are well known in the computer field and this tag may be utilized in conjunction with this system to enable the access control logic of FIG. 1 to keep track of the current user priority level and hence, to only permit him to access data in the memory reserved for his level of priority.

It is also understood that while three separate memories have been shown, a single memory may be employed with blocks of memory reserved for different priority levels and having separate read/write input lines reserved for each block and hence, control and operation of such a memory system can be easily implemented by the above described techniques.

Thus, there has been described apparatus which employs a single processor and enables two or more distinct groups of data to be employed separately from each other, while preventing higher level data from entering a lower level storage.

I claim:

1. Apparatus for the separation of stored data in a processor system, comprising:
   a central processor for processing data as retrieved from a system area as requested by said processor;
   first system area means for storing therein first data of a first given priority, said first system area having a read output line coupled to said processor and a write input terminal;
   second system area means for storing therein second data of a second given higher priority, said second system area having a write input line coupled to said processor and a read output terminal;
   first logic means operative to couple said write input terminal of said first system area means to said processor;
   second logic means operative to couple said read output terminal of said second system area means to said processor; and
   control means connected to said first and second logic means responsive to a request from said processor and operative to inhibit said first logic means and enable said second logic means when said second system area is accessed to thereby enable second data to be exclusively read and written into said second system area means, while always enabling first data to be read into said second system area means whereby said first system area means can only have written therein said first data.

2. The apparatus according to claim 1, wherein said first logic means comprises a first gate in series between said processor and said write input terminal of said first system area, said first gate having a control input for inhibiting the same upon receipt of a control signal from said control means.

3. The apparatus according to claim 1, wherein said second logic means comprises a first gate in series between said processor and said read output terminal, said first gate having a control input for inhibiting the same upon receipt of a control signal from said control means.

4. The apparatus according to claim 2, wherein said first logic means includes a third gate in series between said processor and said first gate, each gate having a control input for inhibiting the same upon receipt of a control signal from said control means.

5. The apparatus according to claim 3, wherein said second logic means includes a fourth gate in series between said processor and said second gate, each gate having a control input for inhibiting the same upon receipt of a control signal from said control means.

6. The apparatus according to claim 2, 3, or 5, wherein said first gates are inhibiting logic gates.

7. Apparatus according to claim 1, wherein said first system area includes a memory device.

8. Apparatus according to claim 1, wherein said second system area includes a memory device.

9. Apparatus according to claim 1, wherein said first system area includes an input/output device.

10. Apparatus according to claim 1, wherein said second system area includes an input/output device.

11. The apparatus according to claim 1, further comprising
third system area means for storing therein third data of an intermediate priority between said first and said higher priority data, said third system area means having a write input terminal and a read output terminal;
third logic means coupling said read output terminal and said write input terminal to said processor and means coupled to said third logic means and responsive to said control means to selectively inhibit said third means from writing into said third system area when a request for said high priority data is made, and to enable the reading and writing of said third data when a request for said third data is made by said processor.

12. The apparatus as in claims 1, 2, 3, 4 or 5, further comprising means for purging any high priority data stored in said processor prior to operating on data of a lower priority.

13. The apparatus according to claim 12, wherein the purging means generates an output signal which may be an alarm if the purge is not complete.

14. The apparatus according to claim 13, wherein the alarm signal is operative to shut down the processor.

15. Apparatus for separating data within a processor system, said system of the type having at least two system areas for storage of first data in a first system area of a given priority and a second system area for storage of second data of a higher priority, a processor for accessing either system area for operating on the data stored therein by addressing said system area desired and for writing data in either system area and reading data from either system area, the combination therewith comprising:
control means responsive to a request by said processor to provide a control signal for access to either data, and
logic means coupled to said processor, first system area and said second system area and responsive to said control signal to prevent said first system area from being written into when said second system area is accessed and to enable reading of said second system area, whereby said first system area cannot receive any data of said higher priority, said logic means further comprising a first redundant gate configuration coupled between said first system area and said processor, and a second redundant gate configuration coupled between said second system area and said processor.

16. A method for the separation of data contained in at least two system areas, each system area coupled to a central processor, with the data as stored in one system area having a higher priority than data stored in a remaining system area, comprising the steps of:
inhibiting the transfer of data from a higher to a lower priority system area when said higher priority system area is accessed by said processor; and
allowing the transfer of data stored in said lower priority system area to said higher priority system area when said lower priority system area is accessed.

* * * * *